July 17, 1951  J. N. STEWART  2,560,829
TEMPERATURE RESPONSIVE CIRCUIT SELECTOR
Filed Oct. 8, 1945

INVENTOR.
James N. Stewart
BY
E. C. Sanborn
Attorney

Patented July 17, 1951

2,560,829

UNITED STATES PATENT OFFICE 2,560,829

TEMPERATURE RESPONSIVE CIRCUIT SELECTOR

James N. Stewart, Waterbury, Conn., assignor to The Bristol Company, Waterbury, Conn., a corporation of Connecticut Application October 8, 1945, Serial No. 620,981

19 Claims. (Cl. 73—341)

This invention relates to circuit selectors, and more especially to means and apparatus for the automatic selection of measuring circuits such as those associated with thermocouples, in order that there may be obtained a measurement or controlling function based upon temperature or other property of that one of a plurality of measured objects which is characterized by the extreme of the magnitude under measurement. The particular application of the present invention lies in the automatic control of temperature where there are involved a number of more or less separate objects or masses having their temperatures individually measured, and normally subject to variations following a common characteristic law. In such measurements it frequently becomes desirable to direct special attention to, or to effect control based upon, the temperature of that object which for any reason may depart from the value obtained upon the other objects. For example, in automatically controlling the temperature of an aircraft engine, by means of the conventional cowl-flap control, it becomes important that the control be based upon the temperature attained by the hottest cylinder of the engine; and, since it is quite possible that, owing to a variety of unforseen conditions, any one of the engine cylinders may rise to a temperature exceeding that of the others, it is important that said cylinder be promptly selected from the group and placed under surveillance. Similar conditions attend the operation of Diesel engines, wherein an excessive rise or fall of temperature characterizing the exhaust from any individual cylinder demands immediate attention. Other applications wherein it becomes important that the maximum or the minimum of a group of similarly varying temperatures be selected for purposes of measurement or control, will be found in catalyst recovery plants in the petroleum industry, in the regulation of oven temperatures in the baking industry, and at various locations in both the mechanical and the electrical elements of power plants.

It is an object of the present invention to provide means for automatically selecting from among a group of two or more condition-sensitive devices that one associated with said condition in its extreme magnitude, and operatively connecting said device to a measuring or controlling instrument, whereby to provide at said instrument a measure of said condition.

It is a further object to provide means whereby, upon the condition to which is exposed another of said devices than that connected to the above measuring instrument becoming the extreme of the group under measurement, connections will be changed whereby to substitute said other sensitive device for that formerly connected to said instrument.

It is a further object to provide means for effecting the above identified objects with a minimum number of electrical contacts in the measuring circuit.

The invention, in its more specific aspects, also comprises provisions for utilizing, in conjunction with a group of two or more temperature sensitive devices individually and selectively connectable to a measuring or controlling instrument, a corresponding group of auxiliary sensitive devices adapted for action through a suitable electrical network to select that one of said first-named temperature sensitive devices which is associated with the highest or the lowest temperature, and connect it to the measuring instrument, leaving it so connected as long as it is measuring the extreme temperature, and changing the connection to correspond similarly with any other sensitive device in the group which may subsequently attain a temperature, higher or lower, as the case may be.

For purposes of explanation, the invention is considered in its application to comparison of the temperatures of a number of solid objects or masses (such, for example, as the cylinders of an internal combustion engine); but there is no intention of so limiting the invention; and it will be obvious that the principles are equally applicable to comparative determination of temperatures of fluid masses, such as furnace atmospheres, and flowing or confined gases or liquids.

Figure 1:
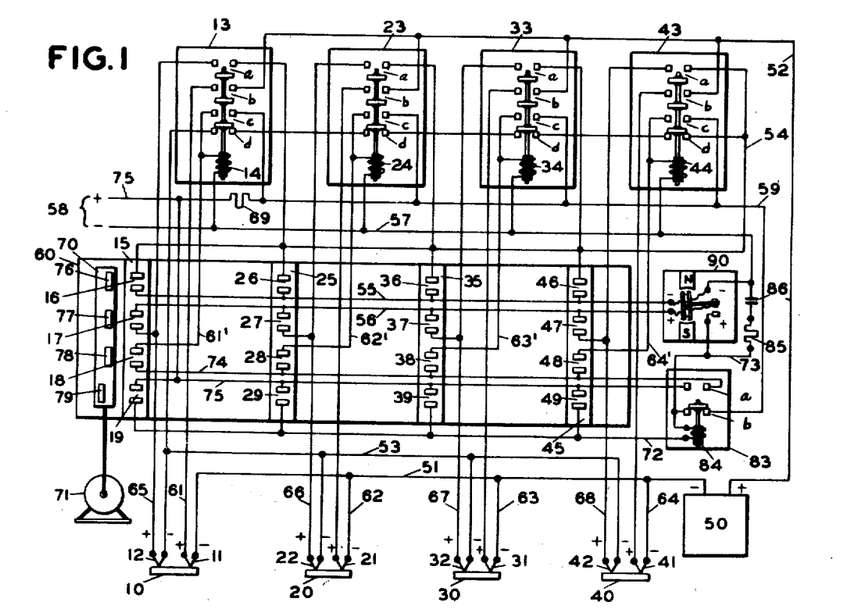
Fig. 1 is a diagrammatic representation of a system embodying the principles of the invention as applied to the selection for association with a measuring instrument of that one of four thermocouples which is associated with the hottest of four independent objects whose temperatures are to be measured or regulated.

Referring now to Fig. 1 of the drawings, the numerals 10, 20, 30 and 40 designate four separate objects or masses subject to temperature variation, and of which it is desired that the temperature of the hottest shall be measured by means of an instrument 50. Thermally associated with the four masses 10, 20, 30 and 40 respectively are corresponding thermocouples 11, 21, 31, and 41, each adapted to develop an electromotive force representative of the temperature of the masses with which it is associated. Means, hereinafter to be described, are provided for selectively associating the thermocouples with the instrument 50; and the present invention rests primarily in rendering such means effective to select the hottest of said four masses and connecting the associated thermocouple to the exclusion of the other thermocouples, to the instrument 50, whereby to cause said instrument to provide a measure of the temperature to which said selected thermocouple is exposed.

Designating the thermocouples 11, 21, 31 and 41 as the "measuring couples," there are provided also four "auxiliary couples," 12, 22, 32 and 42, associated respectively with the masses 10, 20, 30 and 40 in such a manner that their temperatures shall be as nearly as possible identical with those of the corresponding measuring couples. In correspondence with the four masses whose temperatures are to be measured, there are provided four mutually identical relays 13, 23, 33 and 43, said relays having operating solenoids 14, 24, 34 and 44 respectively. Each of said relays has three sets of normally open contacts, designated as a, b and c, respectively and one set of normally closed contacts as d. Thus, when solenoid 14 of relay 13 is energized, contacts 13a, 13b, 13c will be closed, while contact 13d will be open. Upon deenergization of solenoid 14, the conditions of said contacts will be reversed, contact 13a, 13b and 13c being opened and 13d being closed. The designation of contact elements in relays 23, 33 and 43 is exactly similar to that of the elements in relay 13; and the performance of said relays upon energization or deenergization of their respective windings is identical with that of relay 13.

A drum type selector switch 60 is provided with four banks of contacts 15, 25, 35 and 45. The bank 15 comprises four sets of contacts 16, 17, 18 and 19. Similarly the bank 25 comprises four sets of contacts 26, 27, 28 and 29; and the bank 35 comprises four sets of contacts 36, 37, 38, 39; while the bank 45 comprises four sets of contacts 46, 47, 48 and 49. A contact drum 70 is provided with four contact members 76, 77, 78 and 79, and is adapted to be moved by means of a motor 71 transversely of the contact banks 15, 25, 35 and 45, whereby successively to complete the circuits which the sets of contacts comprise in said banks. Said motor 71 is preferably operable at substantially constant speed and may be in continuous operation over any desired period. For example, in the position shown in the drawings, the drum 70 is clear of all contact banks, and all the corresponding circuits are open. If the drum 70 be moved toward the right as shown in the drawing, the contact element 76 will bridge the contact 16; the element 77 will bridge the contact 17; the element 78 will bridge the contact 18; and the element 79 will bridge the contact 19. It will be observed that the contact element 79 is set slightly behind the other three contact elements carried by the drum, so that contacts 16, 17 and 18 are completed momentarily in advance of the completion of contact 19 by contact element 77. As the drum is translated further to the right, its contact elements will engage in succession the contacts which are comprised in banks 25, 35 and 45, completing the circuits at these contacts in the same manner and sequence as the corresponding contacts constituting the bank 15.

Figures 2, 3:
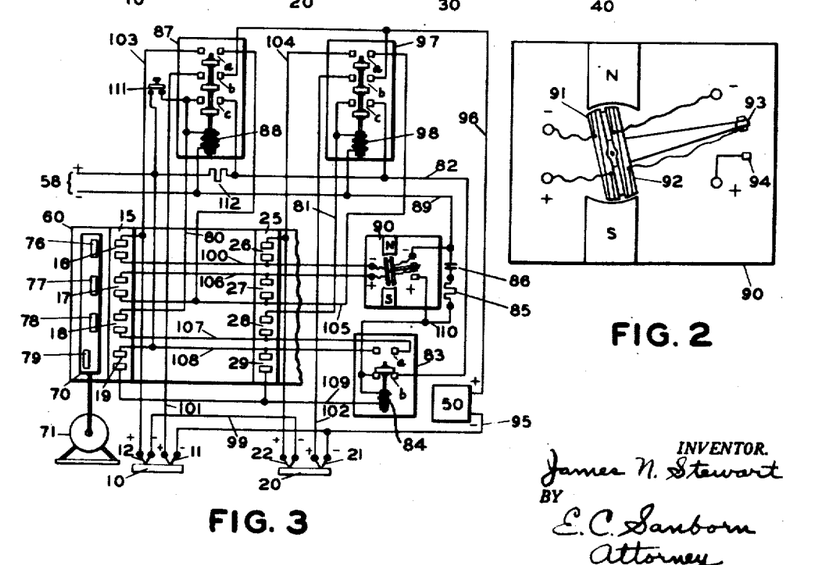
Fig. 2 shows a galvanometer-relay suited to the purposes of the invention.
Fig. 3 is a diagram of the system as applied to selection for measurement or control purposes of the thermocouple associated with the coolest of a group of objects whose temperatures are to be measured or regulated.

A relay 83 is provided with a normally open set of contacts 83a and normally closed set of contacts 83b, together with an operating solenoid 84, whereby, when the same is energized, contacts 83a will be closed and 83b opened, with a reversal of conditions when the solenoid 84 is deenergized. A galvanometer 90, for details of which, reference may be had to Fig. 2, is provided with two electrically independent coils 91 and 92 integrally mounted for deflection through a limited angle between magnet poles N and S, said coil assembly carrying a movable contact 93 adapted for electrical engagement with a stationary contact 94, but normally floating clear of the same when neither of the coils 91—92 is energized. The coil 91, which may be referred to as the "actuating coil," is adapted for connection to the thermocouple circuit in a manner presently to be described. The coil 92, which may be styled the "holding coil," has a resistance relatively low in comparison with that of the relay solenoids 14, 24, etc., and has one terminal directly connected to the movable contact 93, and the other terminal free for connection to an outside circuit hereinafter to be set forth. The polarities assigned to the terminals of the two coils 91 and 92 as indicated in Fig. 2 are those of applied potentials which will cause the moving element to be deflected in a clockwise sense as shown, tending to bring the movable contact 93 into electrical engagement with the stationary contact 94.

The connections by means of which the electromotive forces developed in the several thermocouples are utilized, are as follows: the negative sides (as shown in the drawings) of measuring couples 11, 21, 31, and 41 are connected to a common conductor 51, and thereby to the negative terminal of the measuring instrument 50. The positive sides of said couples are connected by conductors 61, 62, 63, 64, respectively, to one side of each of the relay contact elements 13b, 23b, 33b and 43b, the free sides of said contact elements being connected to a common conductor 52 and thereby to the positive terminal of the instrument 50. The negative terminals of the auxiliary couples 12, 22, 32 and 42 are connected to a common conductor 53 passing through the relay contacts 13d, 23d, 33d and 43d in series and thence to a conductor 54. The positive terminals of the last-named group of couples are connected by means of conductors 65, 66, 67 and 68, respectively, to one side of each of the relay contact elements 13a, 23a, 33a and 43a, the free sides of said contact elements being connected to the conductor 54. To said conductor 54 are connected, also, one side of each of the selector contacts 16, 26, 36, and 46, respectively, the free sides of said contacts being connected to a common conductor 55 and thereby to the negative terminal of the coil 91 in the galvanometer 90. The selector contacts 17, 27, 37 and 47 have each one side tapped to the conductors 65, 66, 67 and 68 respectively, the free sides of said contacts being connected to a common conductor 56, and thereby to the positive terminal of the galvanometer winding 91.

One terminal of each of the relay solenoids 14, 24, 34 and 44 is connected to a conductor 57 forming the negative side of a source of unidirectional current supply 58. The free terminals of said solenoids are respectively connected to conductors 61', 62', 63', and 64'. To said conductors are also respectively connected one side of each of the relay contacts 13c, 23c, 33c, and 43c, and one side of each of the selector contacts 18, 28, 38 and 48. The free sides of said relay contacts are connected to a common conductor 59 and thereby to one side of the normally closed contacts 83b in the relay 83. One side of each of the selector contacts 19, 29, 39 and 49 is connected to a common conductor 72 and thereby to a terminal of the actuating solenoid 84 in the relay 83. The free terminal of said solenoid is connected by means of a conductor 73 to the free side of the relay contact 83b, and also to the galvanometer contact 94. The free terminal of the galvanometer winding 92 is connected to the negative conductor 57; and bridged between said terminal and the conductor 73 is a spark-suppressor comprising a suitably interconnected resistor 85 and capacitor 86. The free sides of the selector contacts 18, 28, 38, and 48 are connected to a common conductor 74, and thereby to one side of the normally open relay contact 83a, the other side of said contact being connected to a conductor 75, forming the positive side of the current source 58, and to which conductor also are connected the free sides of the selector contacts 19, 29, 39, and 49. Connected between the common conductor 59 and the positive conductor 75 is a resistor 69, the purpose of which will hereinafter be explained.

For the purpose of explaining the operation of the apparatus, as adapted to selection of the hottest of a group of thermocouples, it may be assumed that connections are made as shown in Fig. 1, and that the motor 71 is running, causing the drum 70 to be moved continuously toward the right as shown in the drawing. With the drum 70 in the position indicated, where it engages none of the contact banks 15—25 etc., the relays 13, 23 etc., will all remain deenergized, so that only the lower contacts 13d, 23d etc. will be closed. The negative terminals of the auxiliary thermocouples 12, 22 etc., will be connected through conductor 53 and said lower contacts in series to conductor 54 and thereby to contact elements 16, 26 etc., in the respective banks. As there will be no complete circuit for either of the windings of the galvanometer 90, said galvanometer will stand with its contacts 93 and 94 separated. Similarly, since no circuit is completed to the solenoid 84 of the relay 83, said relay will stand with its contact 83a open and its contact 83b closed.

It may now be assumed that the drum 70 has advanced to such a position that its movable contacts engage and thereby complete the circuit through the three upper contact elements in the bank 15, this including contacts 16, 17 and 18. The positive terminal of auxiliary couple 12 will thus be connected through contact elements 17 and contact member 77 to conductor 56, and thereby to the positive terminal of the winding 91 in the galvanometer 90. Conductor 54, which, as hereinbefore pointed out, is at this time connected to conductor 53 and thereby to the negative terminals of the auxiliary couples 12, 22 etc., will be connected through contacts 16 and contact element 76 to the conductor 55, and thereby to the negative terminal of the winding 91, whereby the voltage of couple 12 will be directly impressed upon said winding. The galvanometer moving element will be deflected in a clockwise sense as seen in the drawing, whereby contacts 93 and 94 will be brought into engagement, thereby providing a path from the negative conductor 57 through the winding 92 of the galvanometer and said contacts, in series with the solenoid 84 of relay 83 to the conductor 72. Contact element 78 will also have cooperated with contacts 18 to connect conductor 74 to conductor 61', but because the contact 83a of the relay 83 is open, no circuit through said conductors will at this time be completed. The contact element 79 on the drum 70 being set slightly behind the contacts 76, 77 and 78, there is provided a short time interval in which the above conditions may be established before further circuit modifications are effected.

It may now be assumed that the drum 70 has progressed sufficiently far that the contact 79 has engaged the contact elements 19, thereby interconnecting conductors 72 and 75. It will be seen that there has now been provided a complete path between the negative and positive sides of the circuit 58 through the galvanometer winding 92 and relay solenoid 84, in series with contacts 93 and 94. Current passing through the holding coil 92 will tend to amplify the engaging pressure of the galvanometer contacts and eliminate such tendency to chattering as might result from the relatively weak torque derived only from the thermocouple current flowing in the winding 91. The conductor 59 in series with the normally closed contacts 83b will momentarily provide an alternative connection, shunting the solenoid; but the resistor 69 will limit current through said path to an extent not to inhibit the operation of relay 83 by means of said solenoid. Upon actuation of the relay 83, contact 83b will be opened interrupting the shunt through the resistor 69, and allowing the solenoid 84 to carry the whole current which passes through the holding coil 92. Contacts 83a will be closed, connecting conductor 74 to the positive conductor 75, and thereby, through contact element 18, contacts 78, and conductor 61, providing a path for current from the source 58 through the solenoid 14 in relay 13, thus energizing said relay. Energization of the relay 13 will cause contacts 13d to be opened and contacts 13a, 13b and 13c to be closed. Closing of contacts 13b will connect the positive terminal of measuring couple 11 to conductor 52, thereby completing a circuit whereby the potential of said couple will be applied to the measuring instrument 50, causing said instrument to provide a measure of the temperature of the object 10 with which the couples 11 and 12 are associated. Closing of the contacts 13a will connect to the conductor 54 the positive terminal of auxiliary couple 12 instead of the negative terminal whose connection thereto was interrupted by the opening of contact 13d. Closing of contacts 13c will connect to the conductor 59 that terminal of the solenoid 14 which was originally connected through conductors 61 and 74 to the positive conductor 75. As the drum 70, carrying its contacts 76, 77, 78 and 79 continues to progress toward the right as seen in the drawing, the first three, and subsequently the last-named of said contacts will disengage their associated contact elements, opening the circuits which were completed therethrough. Opening of contacts 16 and contacts 17 will clear the winding 91 from the couple 12, leaving the galvanometer 90 subject solely to torque develop by such current as may be flowing through the winding 92. Opening of contacts 19 will clear the circuit originally responsible for energizing the solenoid 14 in the relay 13; but contact 13c will provide an alternative circuit for the same in series with the resistor 69, whereby said relay will remain in an energized condition, so that the instrument 50 will continue to measure the potential of the couple 11 as applied through the circuit hereinbefore specified, and including the relay contact 13b.

As the contact 19 is broken due to further progress of the drum 70, the circuit through the galvanometer holding coil 92 and the relay solenoid 84 will be interrupted, whereby the galvanometer contacts will be separated, and relay contacts 83a and 83b will revert to their normal condition of open and closed respectively. No further change in conditions will take place until the drum 70 advances to a position where the several contacts carried thereby engage the contact elements constituting the bank 25. Relay 13 having remained energized, the positive terminal of auxiliary couple 12 will remain connected through the contact 13a to the conductor 54, so that upon the engagement of contact element 26 by contact 76 this terminal will again be connected to the conductor 55 and thereby to one side of the galvanometer winding 91. At the same time, the positive terminal of the auxiliary couple 22, associated with the object 20 will be connected through conductor 66 and contact element 27 to conductor 56 and thereby to the other side of said galvanometer winding. As contact 13d is open, the conductor 53 will function solely as a common conductor between the auxiliary thermocouples, with the result that the couples 12 and 22 will be connected in series opposition, and their resultant potential impressed directly upon the galvanometer winding 91. It will be observed, however, that, whereas, when the contact bank 15 was active, the conductor 56 was connected to the positive terminal of the couple 12, the conductor will now be connected to the positive terminal of the couple 22, while the positive terminal of the couple 12 will be connected to the conductor 55. Thus, the effect of the couple 12 upon the deflection of the galvanometer 90 will be the opposite of its original effect, and the net influence of the combined couple will depend in sense upon which of the two develops the higher potential. There are hence two alternatives of performance, depending upon which of the objects 10 and 20 (with which, respectively, are associated the couples 12 and 22) is at the higher temperature.

It may first be assumed that the object 10 is the hotter of the two, when the potential of the couple 12 will predominate, and the net potential applied to the galvanometer coil 91 will be of a polarity to deflect the movement in a sense opposite to the deflection hereinbefore described, thereby maintaining the contacts 93—94 separated, and their circuit open. The relay solenoid 84 will thus remain deenergized, and the contacts 83a will not close. Therefore, subsequent closure of contacts 29 will not complete any circuit, so that the relay 23 will not be operated; and, the relay 13 remaining energized through its contacts 13c, and locked in its actuated position, connections between the thermocouple 11 and the instrument 50 will remain undisturbed; and said instrument will continue to provide a measure of the temperature of the object 10 to which temperature said thermocouple is exposed.

It may now be assumed alternatively, that the relative temperatures of the objects 10 and 20 are interchanged from the above-described condition, the object 20 having become the hotter of the two, so that the potential developed by the couple 22 will be higher than that developed by the couple 12. The net potential between the conductors 55—56, applied to the galvanometer coil 91, will then be of a polarity opposite to that just described, and the galvanometer moving element will be deflected in a sense to bring into mutual engagement the contacts 93—94. There will thus be provided a path including the normally closed relay contacts 83b and the locking contacts 13c in the relay 13, whereby the low resistance holding coil 92 is bridged across the relay solenoid 14; and, the current through the shunt circuit so formed being limited by the resistor 69, the portion thereof flowing in the branch including the solenoid 14 will be reduced to such a low value as to release the moving element of the relay 13, causing the same to revert to its normal deenergized condition.

Engagement of the contacts 93—94 will also have provided a path between line conductors 57—75 through relay solenoid 84 said path being complete, except for separation of the contacts 29, which as hereinbefore set forth, will have their closing delayed a short interval behind that of the other contacts in the corresponding bank. As the last named contacts are brought into engagement by advance of the drum 70, a circuit will be completed through the solenoid 84, energizing the same, opening the contacts 83b and closing contacts 83a. Opening of the first-named of said contacts will further disrupt the bridging circuit already opened by the contacts 13c upon release of the relay 13, while closing of the contacts 83a will now complete a circuit through contacts 28, conductor 62 and the relay solenoid 24, energizing the relay 23, opening its contacts 23d and closing its contacts 23a, 23b and 23c. Closing of contacts 23b will connect the positive terminal of measuring couple 21 to conductor 52, thereby completing a circuit whereby the potential of said couple will be applied to the measuring instrument 50, causing said instrument to provide a measure of the temperature of the object 20 with which the couples 21 and 22 are associated. Closing of the contacts 23a will connect the positive terminal of auxiliary couple 22 to conductor 54, thereby rendering said couple available for subsequent comparison with couple 32. Closing of contact 23c, as hereinbefore set forth in connection with the function of contact 13c in relay 13, will provide a locking circuit, whereby relay 23 will be maintained in an energized condition independently of the galvanometer contacts 93—94.

It will be seen that in the operation of the apparatus as described, there is first provided a measure of the temperature of the hot object 10, after which a comparison is made between the temperature of that object and the object 20. If the object 10 is the hotter of the two, the instrument 50 continues to measure its temperature and ignore that of the object 20. If, on the other hand, the object 20 is the hotter, the measuring function of the instrument will be transferred to that object, and the temperature of the object 10 will no longer be subjected to measurement. In the same manner, as the drum 70 is progressively advanced to contact banks 35 and 45, the temperatures of the objects 30 and 40 will successively be compared with those immediately preceding them, and the instrument 50 placed in operative connection with the hotter of each pair under comparison. Thus, as the cycle of operation determined by the advance of the drum 70 from one to another of the contact banks is repeated, the instrument 50 will measure the temperature of the hottest of the several objects with which the thermocouples are associated, and will continue to provide a measure of a selected object until in the course of a cycle of operation another of said objects is found to have attained a higher temperature value, whereupon the connections of the instrument will be transferred to the thermocouple associated with that object, and will remain so as long as no higher temperature develops in the system.

In Fig. 3 is shown a diagram embodying such changes from the basic arrangement of Fig. 1 as are necessary to adapt the principles of the invention to the selection of the coolest, rather than the hottest, of a group of thermocouples. In the interests of simplicity, there are shown only two of a number of masses with which said couples may be associated, there being the objects 10 and 20 of Fig. 1, to which are presented couples 11 and 12, and 21 and 22, respectively. For ease in comparing the two systems, the revised diagram is shown as incorporating the relay 83 and the galvanometer 90 of Fig. 1, as well as elements of the drum selector switch 60, with its included contacting elements, the combination being operatively associated with the instrument 50 for the purposes to which said instrument is adapted.

Corresponding to the two masses or objects 10 and 20 are provided two mutually identical relays 87 and 97 having operating solenoids 88 and 98 respectively. Each of said relays has three sets of normally open contacts, designated as a, b and c, respectively, said contacts of either relay all being closed when the corresponding solenoid is energized.

The negative terminals of the measuring couples 11 and 21 are connected to a common conductor 95, and thereby to the negative terminal of the measuring instrument 50. The positive terminals of said couples are connected by means of conductors 101 and 102 respectively to one side each of the relay contact elements 87b and 97b, the free sides of said contact elements being connected to a common conductor 96, and thereby to the positive terminal of the instrument 50. The negative terminals of the auxiliary couples 12 and 22 are connected to a common conductor 99, and the positive terminals of said last-named couples, by means of conductors 103 and 104, respectively, to one side of each of the relay contacts 87a and 97a. The selector contacts 16 and 26 have each one side tapped to the conductors 103 and 104, respectively, the free sides of said contacts being connected to a common conductor 100 and thereby to the negative side of the actuating winding 91 in the galvanometer 90. The free sides of the relay contacts 87a and 97a are connected to a common conductor 105, and thereby to one side of each of the selector contacts 17 and 27, the free sides of said selector contacts being connected in turn by means of a common conductor 106 to the positive terminal of the galvanometer winding 91.

One terminal of each of the relay solenoids 88 and 98 is connected to a conductor 89 forming the negative side of the source of unidirectional current supply 58. The free terminals of said solenoids are respectively connected to conductors 80 and 81, to which conductors also are connected respectively one side of each of the relay contacts 87c and 98c, and one side of each of the selector contacts 18 and 28. The free sides of said last-named relay contacts are connected to a common conductor 82, and thereby to one side of the normally closed contacts 83b in the relay 83.

The free sides of selector contacts 18 and 28 are connected by means of a common conductor 107 to one side of the normally open contacts 83a in the relay 83, the other side of said relay contacts being connected to a common conductor 108, forming the positive side of the current source 58, and to which, also, are connected one side of each of the selector contacts 19 and 29. The free sides of said last-named selector contacts are connected by a common conductor 109 to a terminal of the solenoid 84 in the relay 83. The free terminal of said solenoid is connected by means of a conductor 110 to the free side of the relay contact 83b, and also to the galvanometer contact 94. As described in the previously disclosed embodiment of the invention, the movable contact 93 in the galvanometer 90 is connected to one side of the holding coil 92; and the free terminal of said coil is connected to the negative conductor 89. Bridged between said terminal and the conductor 110 is a spark-suppressor comprising the resistor 85 and capacitor 86 interconnected in the same manner as shown in Fig. 1. A spring-opened manually-closed pushbutton switch 111 is connected between the conductor 80 and the line conductor 108; and a current-limiting resistor 112 between the latter conductor and the conductor 82.

The operation of the form of the invention shown in Fig. 3 is essentially similar to that of the form shown in Fig. 1, with certain inherent differences due to selectivity being based on the cooler, rather than the hotter, of any two thermocouples under comparison. With connections made as shown, and voltage applied at the source 58, operation of the system is initiated by momentarily depressing the switch 111, which causes line voltage to be applied to the solenoid 88 energizing the relay 87 and closing its several contacts. A circuit from the measuring couple 11 will be provided through the contacts 87b to the instrument 50, which instrument will provide a measure of the temperature to which said couple is exposed. Contacts 87c will provide a locking circuit in series with the resistor 111, whereby, upon release of the push-button switch 110 the relay 87 will remain energized. With the selector drum 70 in the position indicated, no circuit will be completed through any of the selector contacts, with the result that no potential will be applied to the galvanometer 90, and the relay will stand with its contacts 93 and 94 separated. Thus, the relay 83 will remain deenergized, with its contacts 83a open and its contacts 83b closed. As the drum 70 moves to a position where its contact elements 76, 77 and 78 engage respectively the contacts 16, 17 and 18, corresponding conductors will be interconnected. The contact 16 will provide a connection between conductors 100 and 103 whereby the positive terminal of the thermocouple 12 will be connected to the negative terminal of the coil 91 in the galvanometer 90. At the same time, said positive terminal, through relay contact 87a and selector contacts 17, will be connected to the positive terminal of said galvanometer coil, whereby said coil will be short-circuited, and will remain so until with advance of the drum 70 the contact element 76 clears the contacts 16. As the only complete circuit which can include the thermocouple 12 must also include in opposition thereto the couple 22, interconnected therewith by means of conductor 99 and since the selector contacts 26 and relay contacts 97a are both in an open condition, it follows that no circuit is completed for the thermocouple 12, and no potential applied to the winding 91 in the galvanometer 90. As the drum 70 advances to a position where contact element 79 engages contacts 19, the positive conductor 108 is connected to the conductor 109, whereby one side of the solenoid 84 is placed directly in communication with the positive side of the power supply. Since the contacts in the galvanometer 90 are open, however, no communication is provided between the solenoid 84 and the negative side of the power supply, so that the relay 83 remains deenergized.

Thus, until the selector drum 70 advances to a position of engagement with the contact bank 25, the instrument 50 will continue to provide a measure of the temperature to which the couple 11 is exposed. As the contact elements on the drum 70 engage respectively the contacts 26, 27 and 28 in the bank 25, the contact 26 will provide a connection between the positive terminal of the couple 22 and the negative terminal of the galvanometer coil 91. The relay 87 having remained energized, the positive terminal of the couple 12 will be connected through the selector contacts 27 to the positive terminal of the coil 91. There will thus be applied to said coil a potential representing the difference in thermoelectromotive forces developed by the couples 12 and 22, and the deflection of the galvanometer moving element will depend in sense upon which of said electromotive forces predominates. If the voltage developed in the couple 12 is the greater, signifying that the object 10 is at a higher temperature than the object 20, the net potential in the thermocouple circuit, applied to the terminals of the coil 91 will be such as to deflect the moving element in a clockwise sense, closing the contacts 93—94, whereas, if the voltage of the couple 12 is the lesser, the potential applied to the galvanometer will be of opposite polarity, and said contacts will remain separated.

It may first be assumed that conditions are such that the couple 12 is developing the higher thermoelectromotive force. Closing of the contacts 93—94 will provide through conductors 82, 110 and 89, and the normally closed contacts 83b in the relay 83 a shunt path around the relay solenoid 88 in series with the resistor 112, whereby the force of said solenoid will be weakened to such an extent that the relay 87 is released, opening its three sets of contacts. Opening of contacts 87a will clear couple 12 from its series opposition connection to the couple 22. Opening of contacts 87c clears the relay locking circuit, while opening of contacts 87b serves to disconnect thermocouple 11 from the instrument 50. As the drum 70 advances to a position where its contact element 79 engages the contacts 29, the positive side of the power supply will again be connected to one side of the solenoid 84 in the relay 83. The galvanometer contacts 93—94 being closed, and held closed by current therethrough flowing in the holding coil 92, there will be provided a complete circuit from the positive to the negative side of the supply 58 through the solenoid 84, energizing the relay 83, opening its contacts 83b and closing its contacts 83a. There will now be completed a circuit including selector contacts 28, conductor 107 and 81, and relay solenoid 98, whereby the relay 97 will be energized and all three sets of its contacts closed. Closing of the contacts 97b will complete a circuit whereby the electromotive force developed in couple 21—that associated with the cooler of the two objects under measurement—will be applied to the terminals of the instrument 50 and will be measured thereby. Contacts 97c will provide a locking circuit in series with the resistor 111, whereby the relay 97 will remain energized after interruption of the closing circuit. Closing of contacts 97a will set up a portion of a circuit between the positive terminal of the couple 22 and the positive terminal of the galvanometer coil 91 in anticipation of the succeeding cycle to be established by advance of the drum 70.

It may now be assumed, alternatively, that at the moment the couples 12 and 22 are thrown into series opposition by action of the contact elements carried by the drum 70, the voltage developed by the latter couple is the greater, signifying that of the objects 10 and 20, the object 10 is the cooler. The voltage of the couple 22 predominating, the net potential applied to the terminals of the galvanometer coil 91 will be such as to maintain the contacts 93, 94 separated, so that the relay 87 will remain energized, and relay 83 will remain deenergized. Under this condition no change will take place in the connections to the instrument 50; and the latter will continue to provide a measure of the temperature to which the thermocouple 11 is exposed. The operation as thus described may be extended to any number of thermocouple groups similarly associated with masses or objects whose temperatures are to be selectively determined; and, as the selector drum advances from bank to bank of associated contacts, the temperature of each object will be compared with that of the object measured immediately beforehand, and that having the lower temperature selected for operative connection to the instrument 50, which will continue to provide a measure of the temperature of that object until in the course of an operating cycle another of said objects is found to have attained a lower temperature, whereupon the connections of the instrument will be transferred to the couple associated with that object, and will remain so as long as there develops no lower temperature among the objects or masses under measurement.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for selecting for temperature measurement that one of two masses whose temperature is the extreme in a certain direction, said apparatus comprising individual temperature-sensitive elements for producing electrical effects proportional to the temperatures of the respective masses, means for comparing said electrical effects in opposed relationship to obtain a resultant electrical effect differentially representative of the opposed influences of said first-named electrical effects and of a polarity dependent upon the predominance of one of said opposed effects over the other, a measuring instrument, other temperature-sensitive elements individually and thermally associated with said masses, and means subject to said resultant electrical effect for connecting said instrument with one of said last-named elements in accordance with the polarity of said resultant effect.

2. Apparatus for selecting for temperature measurement that one of a plurality of masses whose temperature is the extreme in a certain direction, said apparatus comprising individual temperature-sensitive elements for producing electrical effects proportional to the temperatures of the respective masses, means for progressively pairing said elements in opposed relationship to obtain a resultant electrical effect differentially representative of the opposed influences of the electrical effects of each of said pairs and of a polarity dependent upon the predominance of one of said opposed effects over the other, other temperature-sensitive elements individually and thermally associated with said masses, and means responsive to the resultant electrical effect of each of said pairs of the first mentioned temperature-sensitive elements for establishing a temperature-measuring connection to one of said other temperature-sensitive elements in accordance with the polarity of said resultant effect.

3. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, means for progressively pairing said elements in opposed relationship to obtain a resultant electrical effect differentially representative of the opposed influences of the electrical effects of each of said pairs and of a polarity dependent upon the predominance of one of said opposed effects over the other, a measuring instrument, other temperature-sensitive elements individually and thermally associated with said masses, and means subject to the resultant electrical effect of each of said pairs of the first-mentioned temperature-sensitive elements for connecting said instrument with one of said last-named elements in accordance with the polarity of said resultant effect.

4. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, means for progressively connecting a pair of said elements in opposed relationship to obtain a resultant electrical effect differentially representative of the opposed influences of the electrical effects of said elements and of a polarity dependent upon the predominance of one of said opposed effects over the other, means responsive to said resultant electrical effect and movable in a direction determined by the polarity of said effect, a measuring instrument, other temperature-sensitive elements individually and thermally associated with said masses, means controlled by said responsive means for connecting said instrument with one of said last-named elements in accordance with the polarity of said resultant electrical effect to measure the temperature of the mass associated with one of said pair of said first-mentioned elements, and means for connecting said element of said pair to said responsive means in opposed relation to a further one of said first-mentioned elements.

5. Apparatus for selecting for temperatui ? measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, switching means for successively coupling selected pairs of said elements in opposed relationship to said electromagnetic means, other temperature-sensitive elements individually and thermally associated with said masses, and relay means controlled by said electromagnetic means for establishing a temperature-measuring connection with one of said other temperature-sensitive elements for measurement of the temperature of that one of said masses which has said extreme temperature.

6. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, a galvanometer operable in either of opposite directions in accordance with the direction of current flow therethrough, switching means for successively coupling selected pairs of said elements in opposed relationship to said galvanometer, other temperature-sensitive elements individually and thermally associated with said masses, a plurality of relay means for establishing temperature-measuring connection to said other temperature-sensitive elements, and means controlled by said galvanometer for actuating the relay means corresponding to that one of said masses which has the extreme temperature in a certain direction.

7. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the directions of current flow therethrough, switching means for successively coupling selected pairs of said elements in opposed relationship to said electromagnetic means, other temperature-sensitive elements individually and thermally associated with said masses, relay means for establishing temperature-measuring connections to said other temperature-sensitive elements respectively, means controlled by said electromagnet means for actuating the relay means corresponding to that one of said masses which has the extreme temperature in a certain direction, and means for maintaining the actuated relay means in actuated condition until another of said masses exceeds said temperature in said direction.

8. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, a plurality of relays, one for each of said temperature-sensitive elements, a plurality of banks of contacts, one bank for each of said temperature-sensitive elements, each bank having contacts connected respectively to opposite terminals of said electromagnetic means, each bank also having a contact connected to a corresponding one of said relays, switching means comprising contacts movable into engagement with said banks of contacts in predetermined succession, connections for placing the temperature-sensitive element corresponding to the bank of contacts engaged by said switching means into opposed relation with another temperature-sensitive element to thereby subject said electromagnetic means to the differential electrical effect of said elements, means responsive to operation of said electromagnetic means in a given direction and cooperating with said contact bank for bringing into action the relay connected to said bank, other temperature-sensitive elements individually and thermally associated with said masses, and means controlled by said relay for establishing a connection to one of said last-named elements for measurement of the temperature of the corresponding mass.

9. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, a plurality of relays, one for each of said temperature-sensitive elements, a plurality of banks of contacts, one bank for each of said temperature-sensitive elements, each bank having contacts connected respectively to opposite terminals of said electromagnetic means, each bank also having a contact connected to a corresponding one of said relays, switching means comprising contacts movable into engagement with said banks of contacts in predetermined succession, connections for placing the temperature-sensitive element corresponding to the bank of contacts engaged by said switching means into opposed relation with another temperature sensitive element to thereby subject said electromagnetic means to the differential electrical effect of said elements, means responsive to operation of said electromagnetic means in a given direction and cooperating with said contact bank for bringing into action the relay connected to said bank, other temperature-sensitive elements individually and thermally associated with said masses, means controlled by said relay upon actuation thereof for establishing a connection to one of said last-mentioned elements for measurement of the temperature of the corresponding mass, and other means controlled by said relay for maintaining the latter in actuated condition until the temperature of another of said masses exceeds the temperature of said selected mass in a given direction.

10. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, a plurality of relays, one for each of said temperature-sensitive elements, a plurality of banks of contacts, one bank for each of said temperature-sensitive elements, each bank having contacts connected respectively to opposite terminals of said electromagnetic means, each bank also having a contact connected to a corresponding one of said relays, switching means comprising contacts movable into engagement with said banks of contacts in predetermined succession, connections for placing the temperature-sensitive element corresponding to the bank of contacts engaged by said switching means into opposed relation with another temperature-sensitive element to thereby subject said electromagnetic means to the differential electrical effect of said elements, means responsive to operation of said electromagnetic means in a given direction and cooperating with said contact for bringing into action the relay connected to said bank, other temperature-sensitive element individually and thermally associated with said masses, means controlled by said relay upon actuation thereof for establishing a connection to one of said last-mentioned elements for measurement of the temperature of the corresponding mass, and other connecting means controlled by said relay for connecting one terminal of the corresponding one of the first-mentioned temperature-sensitive elements to a contact in the succeeding bank.

11. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, a plurality of relays, one for each of said temperature-sensitive elements, a plurality of banks of contacts, one bank for each of said temperature-sensitive elements, each bank having contacts connected respectively to opposite terminals of said electromagnetic means, each bank also having a contact connected to a corresponding one of said relays, switching means comprising contacts movable into engagement with said banks of contacts in predetermined succession, connections for placing the temperature-sensitive element corresponding to the bank of contacts engaged by said switching means into opposed relation with another temperature-sensitive element to thereby subject said electromagnetic means to the differential electric effect of said elements, each of said bank of contacts further having a contact engageable by the switching means upon an additional movement of the latter, means responsive to operation of said electromagnetic means in a given direction and to engagement of the last mentioned contact of a bank by said switching means for bringing into action the relay connected to said bank, other temperature-sensitive elements individually and thermally associated with said masses, and means controlled by said relay for establishing a connection to one of said last-named elements for measurement of the temperature of the corresponding mass.

12. Apparatus for selecting for temperature measurement that one of a plurality of masses whose temperature is the extreme in a certain direction, said apparatus comprising individual temperature-sensitive elements adapted to produce electrical effects proportional to the temperatures of the respective masses, electromagnetic means movable in either of opposite directions in accordance with the direction of current flow therethrough, a plurality of relays, one for each of said temperature-sensitive elements, a plurality of banks of contacts, one bank for each of said temperature-sensitive elements, each bank having contacts connected respectively to opposite terminals of said electromagnetic means, each bank also having a contact connected to a corresponding one of said relays, switching means comprising contacts movable into engagement with said banks of contacts in predetermined succession, connections for placing the temperature-sensitive element corresponding to the bank of contacts engaged by said switching means into opposed relation with another temperature-sensitive element to thereby subject said electromagnetic means to the differential electrical effect of said elements, means responsive to operation of said electromagnetic means in a given direction and cooperating with said contact bank for bringing into action the relay connected to said bank, other temperature-sensitive elements individually and thermally associated with said masses, and means controlled by said relay for establishing a connection to one of said last-mentioned elements for measurement of the temperature of the corresponding mass, and means for operating said switching means at substantially constant speed into successive engagement with said contact banks.

13. In a system for measuring the temperature of a selected one of two masses, a set of temperature-sensitive elements adapted to produce electrical effects proportional to the temperatures of the respective masses, means for comparing said effects in opposed relationship to obtain a resultant electrical effect differentially representative of the opposed influences of said first named electrical effects and of a polarity dependent upon the predominance of one of said opposed effects over the other, a second set of temperature-sensitive elements adapted to produce effects proportional to the temperatures of the respective masses, a measuring instrument, and means responsive to the aforesaid resultant electrical effect for connecting said instrument to one of the elements of said second set in accordance with the polarity of said resultant effect.

14. In a system for measuring the temperature of a selected one of a plurality of masses, a first group of temperature-sensitive elements adapted to produce electrical effects proportional to the temperatures of the respective masses, means for progressively pairing said elements in opposed relationship to obtain a resultant electrical effect differentially representative of the opposed influences of the electrical effects of each of said pairs and of a polarity dependent upon the predominance of one of the opposed effects over the other, a second group of temperature-sensitive elements adapted to produce effects proportional to the temperatures of the respective masses, a measuring instrument, and means responsive to the resultant electrical effect of each of said pairs of elements of the first group for connecting said measuring instrument with an element of the second group in accordance with the polarity of said resultant effect.

15. In a system for measuring the temperature of a selected one of a plurality of masses, a first group of temperature-sensitive elements adapted to produce electrical effects proportional to the temperatures of the respective masses, electromagnetic means movable in either of opposite directions in accordance with the direction of current flow therethrough, switching means for connecting different pairs of said elements in succession to said electromagnetic means with the elements of each pair in opposed relationship to subject said electromagnetic means to the resultant electrical effect of said opposed elements, relay means controlled by said electromagnetic means, a measuring instrument, a second group of temperature-sensitive elements adapted to produce effects proportional to the temperatures of the respective masses, and means controlled by said relay means for connecting said instrument with an element in said second group in accordance with the polarity of said resultant effect.

16. In a system for measuring the temperature of a selected one of two masses, a set of temperature-sensitive elements adapted to produce electrical effects proportional to the temperatures of the respective masses, means for comparing said effects in opposed relationship to obtain a resultant electrical effect differentially representative of the opposed influences of said first-named electrical effects and of a polarity dependent upon the predominance of one of said opposed effects over the other, a second set of temperature-sensitive elements adapted to produce electrical effects proportional to the temperatures of the respective masses, an electrical measuring instrument, and means responsive to the aforesaid resultant effect for electrically connecting said instrument to one of the elements of said second set in accordance with the polarity of said resultant effect.

17. In a system for measuring the temperature of a selected one of a plurality of masses, a first group of temperature-sensitive elements adapted to produce electrical effects proportional to the temperatures of the respective masses, electromagnetic means movable in either of opposite directions in accordance with the direction of current flow therethrough, switching means for connecting different pairs of said elements in succession to said electromagnetic means with the elements of each pair in opposed relationship to subject said electromagnetic means to the resultant electrical effect of said opposed elements, relay means controlled by said eletcromagnetic means, an electrical measuring instrument, a second group of temperature-sensitive elements adapted to produce electrical effects proportional to the temperatures of the respective masses, and means controlled by said relay means for electrically connecting said instrument with an element in said second group in accordance with the direction of operation of said electromagnetic means.

18. In a system for measuring the temperature of a selected one of a plurality of masses, a group of temperature-sensitive elements adapted to produce electrical effects proportional to the temperatures of the respective masses, a galvanometer operable in either of opposite directions in accordance with the direction of current flow therethrough, switching means for successively applying to said galvanometer the net voltages of selected pairs of said temperature-sensitive elements connected in opposition to thereby actuate said galvanometer in a direction dependent upon the relative temperatures of opposed couples, a second group of temperature-responsive elements adapted to produce electrical effects proportional to the temperatures of said respective masses, an electrical measuring instrument, and relay means controlled by said galvanometer for establishing a connection between said instrument and a temperature sensitive element of said second group in accordance with the direction of actuation of said galvanometer.

19. In a system for measuring, the temperature of a selected one of a plurality of masses, a group of temperature-sensitive elements adapted to produce electrical effects proportional to the temperatures of the respective masses, a galvanometer operable in either of opposite directions in accordance with the direction of current flow therethrough, switching means for successively connecting in series opposition selected pairs of said temperature-sensitive elements and applying their combined electrical effects to said galvanometer to actuate the same in a direction dependent upon the relative magnitude of said electrical effects, a second group of temperature-sensitive elements adapted to produce effects proportional to the temperatures of said respective masses, a measuring instrument, and relay means controlled by said galvanometer for establishing a connection between said instrument and that one of the temperature-sensitive elements of said second group which corresponds to the mass having the extreme temperature in a desired direction.

JAMES N. STEWART.

REFERENCES CITED

The following references are of record in the file of this patent:

UNITED STATES PATENTS

| Number | Name | Date |
| --- | --- | --- |
| 1,775,540 | Taylor | Sept. 9, 1930 |
| 1,775,682 | Martin | Sept. 16, 1930 |
| 1,893,847 | Simpson | Jan. 10, 1933 |
| 2,444,421 | Boston | July 6, 1948 |